Patented Sept. 22, 1936

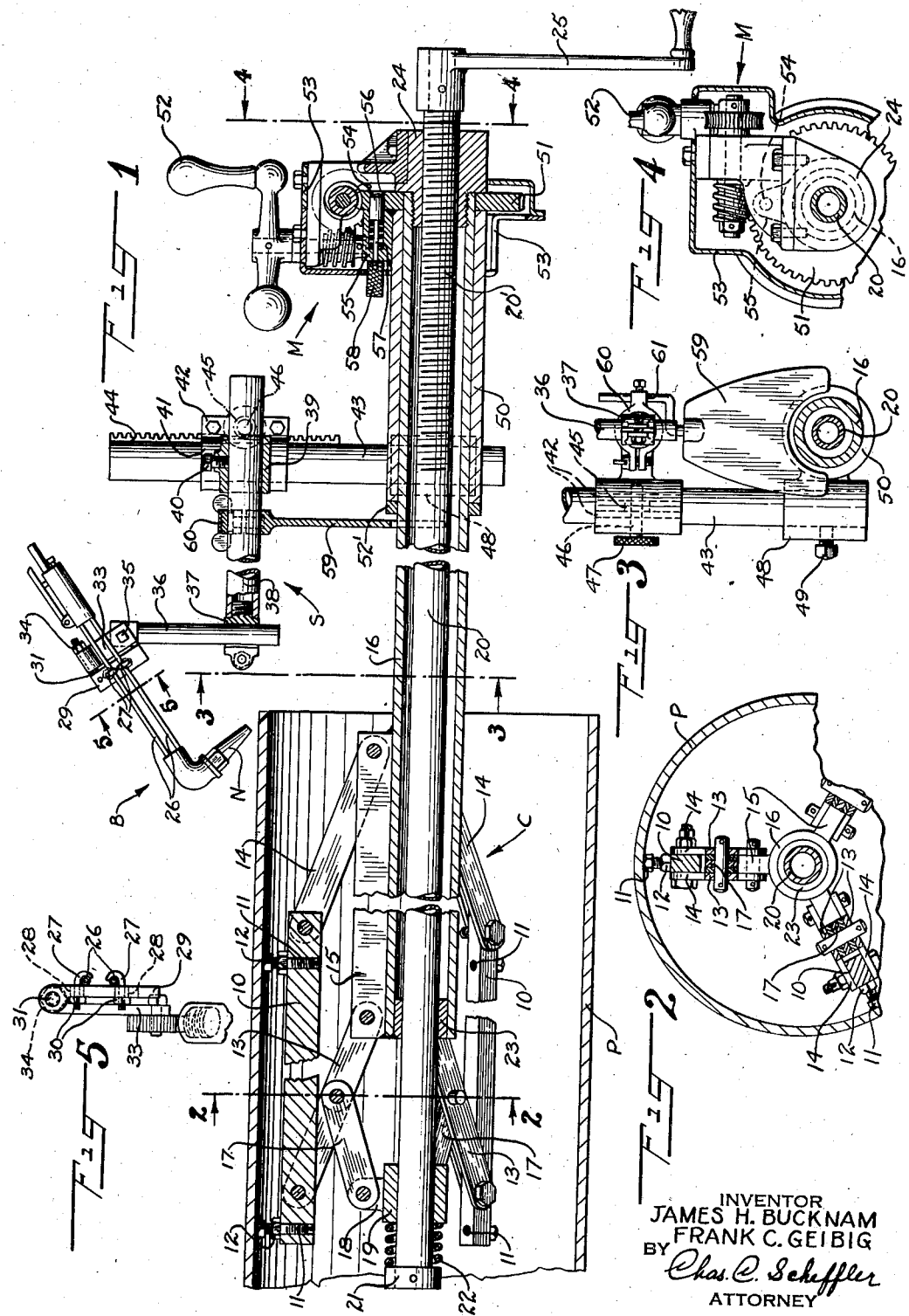

2,054,925

UNITED STATES PATENT OFFICE 2,054,925

PIPE-END CUTTING OR BEVELING APPARATUS

James H. Bucknam, Cranford, and Frank C. Geibig, Westfield, N. J., assignors, by mesne assignments, to Union Carbide and Carbon Corporation, a corporation of New York Application July 21, 1934, Serial No. 736,312

12 Claims. (Cl. 266—23)

This invention relates to apparatus for cutting or beveling the ends of pipes and like hollow bodies.

The objects of this invention are: to provide a simple apparatus which can be supported at the open end of hollow bodies, such as pipes, and easily manipulated to produce cuts or bevels at pipe-ends; to provide such apparatus which can be readily clamped to the open ends of hollow bodies of widely varying size; to provide mechanism for automatically centering the apparatus with precision at the open ends of pipes, whereby beveled cuts true and accurate in slope throughout the circumference of a pipe are assured; and to provide means for protecting the operating mechanism from sparks and the heat of the cutting flame.

These and other objects of our invention will become apparent as the following description proceeds, having reference to the accompanying drawing, in which:

Fig. 1 is a longitudinal sectional view of a pipe-end cutting or beveling apparatus embodying the principles of this invention, the apparatus being shown clamped within the open end of a pipe;

Fig. 2 is a sectional view taken on line 2—2 of Fig. 1, illustrating the manner in which the clamping device automatically centers the apparatus with precision at the center line of the pipe;

Fig. 3 is a view taken on line 3—3 of Fig. 1, illustrating details of the rotatable blowpipe supporting structure;

Fig. 4 is a view taken on line 4—4 of Fig. 1 to illustrate more clearly the mechanism for rotating the blow-pipe supporting structure;

Fig. 5 is a view taken on line 5—5 of Fig. 1 to illustrate details of the blowpipe supporting clamp.

Referring to the drawing, the apparatus embodying the principles of this invention comprises a clamping device C adapted to be inserted and clamped within the open end of a pipe P. The clamping device C may comprise a plurality of radially movable elements or bars 10 extending lengthwise within the pipe P and having at opposite ends thereof threaded studs 11 provided with lock nuts 12 secured thereto. The studs 11 permit a small radial adjustment in the clamping action of each bar 10 to adapt the clamping device to pipes having irregular surfaces, and also assure a firm grip of the apparatus on the pipe when the bars 10 are forced radially outward against the inner wall of the pipe.

The opposite ends of each bar 10 are pivotally connected to the ends of spaced and parallel links 13 and 14, respectively, the opposite ends of which links are pivotally connected to the ends of bars 15 extending parallel to the bars 10 and secured, as by welding, to the end of a tubular member 16 disposed within the open end of the pipe P.

The bars 10 may be forced radially outward and maintained in such outer position by mechanism comprising toggle links 17 each having one of its ends pivotally connected to one of the links 13 intermediate the ends thereof, and its opposite end pivotally connected to one of the lugs 18 formed integral with a collar 19. A shaft 20, preferably hollow for the sake of lightness, extends through the tubular member 16 and the collar 19, and at the end thereof is fixedly secured a collar 21 between which and the collar 19 is disposed a helical spring 22 on the shaft 20. This shaft is journaled within the tubular member 16 at one end by a bushing 23 and at the opposite end by an enlarged nut 24 threadedly secured to the tubular member. The nut 24 is internally threaded and is adapted to engage the threaded portion 20' of the shaft 20. A handle 25 is fixed to the outer end of the shaft 20 for moving the same axially within the tubular member 16.

At the portion of the tubular member projecting from the open end of the pipe P are mounted the support S for a blowpipe B and the mechanism M for driving the same relatively to the pipe P. Although any type of blowpipe or cutting torch capable of delivering gaseous heating and oxidizing agents may be employed, the particular blowpipe B illustrated is of the type having exposed parallel tubes 26 for delivering the gases to the nozzle N. The blowpipe supporting clamps may comprise a pair of rods 27 having bent portions at one end thereof which form hooks to grip the tubes 26. The opposite ends of the rods 27 extend through openings 28 in a clamping plate 29 and are threaded to receive tightening nuts 30. The openings 28 are made sufficiently large to permit an adjustment of the rods 27 so that different size blowpipes may be secured to the clamping plate 29. At one end of this clamping plate is secured a stud 31 which fits into an opening formed at an end of a plate member 33 and is threaded to receive a tightening nut 34. It will thus be seen that the clamping plate 29 with the blowpipe B mounted thereon may be angularly adjustable on the plate member 33 in a plane at an angle to the longitudinal axis of the pipe P.

The plate member 33 is connected at 35 to the outer end of a post 36 and angularly adjustable thereon, in a plane at a right angle to the angular adjustment just mentioned, to position the nozzle at a right angle or at any desired acute angle to the longitudinal axis of the pipe P for producing either a straight edge cut or a beveled cut of any slope at the open end of the pipe.

The post 36 is disposed at a right angle to the tubular member 16 and is supported by and radially and angularly adjustable in a clamp 37 secured to an end of an arm 38. This arm is arranged parallel to the tubular member 16 and is axially movable in a bushing 39 having a locking screw 40 to position the blowpipe B relative to the pipe P, which bushing may be formed integral with a split sleeve 41 having spaced flanges 42. A post 43 disposed parallel to the post 36 and provided with a toothed rack 44 is adapted to receive the split sleeve 41, and radial movement may be imparted to the sleeve by a pinion 45 which is disposed between the spaced flanges 42 and engages the toothed rack 44. The pinion 45 is secured to a pin 46 journaled in openings in the spaced flanges 42, the outer end of the pin having a knurled knob 47 fixed thereto for turning the pin and pinion 45 and moving the sleeve 41 along the post 43.

The post 43 and the structure mounted thereon including the blowpipe B are adapted to be rotatably mounted as a unit on the tubular member 16. The post 43 may be mounted in an opening in a boss 48 and secured thereto by a set screw 49, the boss 48 being formed integral with a sleeve member 50 loosely mounted on the tubular member 16. A worm gear 51 is disposed adjacent to one end of the sleeve member 50 and this gear and the sleeve member are disposed between a collar 52' fixed to the tubular member 16 and the enlarged nut 24. The worm gear 51 may be rotated on the tubular member 16 by turning a handle 52 that actuates gearing meshing the gear 51, all of the gearing preferably being enclosed in a housing 53 forming part of a bracket attached to the enlarged nut 24.

Motion is transmitted from the gear 51 to the sleeve member 50 by a coupling comprising a plunger 54 axially movable in a small casing 55 attached, as by welding, to the sleeve member 50. The plunger 54 is adapted to engage an aperture 56 in the gear wheel 51, and is biased to slide into the aperture by a spring 57 disposed in the small casing 55. This casing is also enclosed by the gear housing 53, one end of the plunger 54 extending through an opening therein and having a control knob 58 fixed thereto for disengaging the plunger 54 from the gear wheel 51.

In order to protect as much of the apparatus as possible from sparks and the heat of the cutting flame, a shield 59 rotatable with the blowpipe B is arranged to be supported by a clamp 60 on the arm 38. The shield may be formed of any suitable material, such as bronze, is relatively wide, and the portion thereof adjacent the tubular member 16 is recessed to fit snugly about the same. When the arm 38 is moved radially outward on the post 43, the shield 59 can again be positioned, by means of the sliding connection 61 of the shield to the clamp 60, so that the recessed portion fits snugly about the tubular member 16.

The operation of the apparatus just described is substantially as follows: The clamping device C of the apparatus is inserted in the open end of the pipe P and the handle 25 turned to move the shaft 20 axially to the right, as indicated by the arrow. This movement of the shaft will cause the collar 21 and spring 22 to move the collar 19 which imparts, through the toggle links 17 and links 13 and 14, a radial movement to the bars 10. With sufficient radial movement of the bars 10, the studs 11 will tightly grip and clamp the 10, the studs 11 will tightly grip and clamp the apparatus to the open end of the pipe P with the spring 21 tending to resist or oppose the axial movement of the shaft 20 after the studs 11 contact the wall of the pipe, thereby insuring an effective action of the clamping mechanism.

The blowpipe B is now ready to be adjusted in a cutting position adjacent the end of the pipe P. The various adjustments that can be made should be apparent from the foregoing description of the apparatus. Either straight edge or beveled cuts can be made and, as shown in Fig. 1, the blowpipe B is positioned to produce a beveled cut at the open end of the pipe P. After the proper adjustments have been made, the blowpipe B is ready to be rotated about the pipe P by turning the handle 52 of the driving mechanism M. This driving mechanism is independent of the mechanism for clamping the apparatus to the pipe P, and it will be noted that the handle 52 will always remain in the vertical position shown to facilitate the operation of the apparatus.

When it is desired to start a cut at any particular point on the circumference of a pipe, the plunger 54 is disengagd from the gear wheel 51 by pulling the knob 58 and the blowpipe B is freely rotated to the position desired. The operator then turns the handle 52 until the plunger 54 is in alignment with the aperture 56 in the gear wheel 51 and urged therein by the tension spring 57. The gases may then be supplied to the blowpipe B to produce jets of gaseous heating and oxidizing agents delivered by the nozzle N, and the handle 52 turned to rotate the blowpipe B about the pipe P.

By properly adjusting the position of the studs 11 on the bars 10, the studs on each bar can be arranged to contact the wall of the pipe P simultaneously. When a plurality of such bars are provided in spaced relation, as shown in Fig. 2, the tubular member 16 and shaft 20 are automatically centered with precision at the center line of the pipe. With such accurate centering of the apparatus the tip of the nozzle N will always remain the same distance from the outer periphery on the pipe P as it is being driven about the same to make a cut. This is particularly important in making beveled cuts because the gaseous heating and oxidizing agents will always strike the pipe in the same plane at a right angle to the longitudinal axis of the pipe. This insures beveled cuts which are true and accurate in slope about the entire circumference of the pipe; and when pipes having such cuts are aligned end to end to be welded together the pipe-ends fit accurately without any spaces therebetween, thereby insuring that a sound weld deposit can be made and a strong joint obtained.

The apparatus can be made readily adaptable for all sizes of pipe. When it is desired to cut or bevel the ends of pipes for which the links 13 and 14 are too short, these links can easily be replaced with longer links. It will therefore be seen that an apparatus has been provided which is extremely flexible and can be easily manipulated for cutting or beveling pipe-ends.

While we have shown and described a particular embodiment of our invention, it will be apparent that many modifications may be made without departing from the spirit and scope thereof as set forth in the appended claims.

We claim:

1. In apparatus of the character described, the combination of a tubular member adapted to be inserted in the open end of a pipe with a portion thereof projecting beyond such open end, clamping means mounted on said tubular member adjacent the inner end thereof for supporting the said tubular member within the pipe substantially in its center line, a shaft extending through said tubular member and operatively connected to said clamping means, means at the outer end of said tubular member for axially moving said shaft to actuate said clamping means, a rotatable sleeve member disposed about said tubular member at the outer end thereof and axially immovable thereon, blowpipe means carried by said sleeve member, and mechanism including gearing mounted on said tubular member for rotating said sleeve member and blowpipe means carried thereby.

2. In apparatus of the character described, the combination of a tubular member adapted to be inserted in the open end of a pipe with a portion thereof projecting beyond such open end, clamping means mounted on said tubular member adjacent the inner end thereof for supporting the said tubular member within the pipe substantially in its center line, a shaft extending through said tubular member and operatively connected to said clamping means, means at the outer end of said tubular member for axially moving said shaft to actuate said clamping means, a rotatable sleeve member disposed about said tubular member at the outer end thereof and axially immovable thereon, blowpipe means operative to deliver jets of gaseous heating and oxidizing agents carried by said sleeve member, a housing mounted on said tubular member at the outer end thereof, mechanism including gearing disposed within said housing for rotating said sleeve member and blowpipe means carried thereby, and means including a handle disposed outside said housing and cooperating with said mechanism for actuating the latter.

3. In apparatus of the character described, the combination of a tubular member adapted to be inserted in the open end of a pipe with a portion thereof projecting beyond such open end, clamping means mounted on said tubular member adjacent the inner end thereof for supporting the said tubular member within the pipe substantially in its center line, a shaft extending through said tubular member and operatively connected to said clamping means, means at the outer end of said tubular member for axially moving said shaft to actuate said clamping means, a rotatable sleeve member disposed about said tubular member at the outer end thereof and axially immovable thereon, blowpipe means operative to deliver jets of gaseous heating and oxidizing agents carried by said sleeve member, mechanism mounted on said tubular member for rotating said sleeve member and blowpipe means carried thereby, means connected to said mechanism for operating the latter, and coupling means associated with said mechanism for rendering the latter operative or inoperative to rotate said sleeve member.

4. In apparatus of the character described, the combination of a tubular member adapted to be inserted in the open end of a pipe with a portion thereof projecting beyond such open end, clamping means mounted on said tubular member adjacent the inner end thereof for supporting the said tubular member within the pipe substantially in its center line, a shaft extending through said tubular member and operatively connected to said clamping means, means at the outer end of said tubular member for axially moving said shaft to actuate said clamping means, a rotatable sleeve member disposed about said tubular member at the outer end thereof and axially immovable thereon, blowpipe means operative to deliver jets of gaseous heating and oxidizing agents carried by said sleeve member, mechanism including gearing for rotating said sleeve member and blowpipe means carried thereby, coupling means associated with said mechanism for rendering the latter inoperative to rotate said sleeve member and for permitting said sleeve member to be manually rotated to position said blowpipe means at a desired point adjacent the circumference of the pipe, and means cooperating with said coupling means for automatically rendering said mechanism operative to rotate said sleeve member from the point at which said blowpipe means is positioned.

5. In apparatus of the character described, the combination of a tubular member adapted to be inserted in the open end of a pipe with a portion thereof projecting beyond such open end, clamping means mounted on said tubular member adjacent the inner end thereof for supporting the said tubular member within the pipe substantially in its center line, a shaft extending through said tubular member and operatively connected to said clamping means, means at the outer end of said tubular member for axially moving said shaft to actuate said clamping means, a rotatable sleeve member disposed about said tubular member at the outer end thereof and axially immovable thereon, blowpipe means carried by said sleeve member, a gear having an opening therein rotatably mounted on said tubular member adjacent said sleeve member, mechanism including gearing for rotating said gear mounted on said tubular member, and coupling means secured to said sleeve member and including a plunger adapted to fit into the opening in said gear for operatively connecting said gear and said sleeve member so that said mechanism is operative to rotate said sleeve member and blowpipe means carried thereby.

6. In apparatus of the character described, the combination of a tubular member adapted to be inserted in the open end of a pipe with a portion thereof projecting beyond such open end, clamping means mounted on said tubular member adjacent the inner end thereof for supporting the said tubular member within the pipe substantially in its center line, a shaft extending through said tubular member and operatively connected to said clamping means, means at the outer end of said tubular member for axially moving said shaft to actuate said clamping means, a rotatable sleeve member disposed about said tubular member at the outer end thereof and axially immovable thereon, blowpipe means carried by said sleeve member, a gear having an opening therein rotatably mounted on said tubular member adjacent said sleeve member, mechanism including gearing for rotating said gear mounted on said tubular member, coupling means secured to said sleeve member and including a movable plunger adapted to fit into the opening in said gear for operatively connecting said gear and said sleeve member so that said mechanism is operative to rotate said sleeve member and blowpipe means carried thereby, and resilient means normally urging said movable plunger toward the face of said gear having the opening therein.

7. In apparatus of the character described, the combination of a tubular member adapted to be inserted in the open end of a pipe with a portion thereof projecting beyond such open end, clamping means mounted on said tubular member adjacent the inner end thereof for supporting the said tubular member within the pipe substantially in its center line, a shaft extending through said tubular member and operatively connected to said clamping means, means at the outer end of said tubular member for axially moving said shaft to actuate said clamping means, a rotatable sleeve member disposed about said tubular member at the outer end thereof and axially immovable thereon, a post normally spaced from the open end of the pipe and disposed radially to said sleeve member and mounted thereon, blowpipe means operative to deliver jets of heating and oxidizing agents, means including an arm extending substantially parallel to said tubular member and mounted on said post for supporting said blowpipe means, and mechanism including gearing mounted on said tubular member for rotating said sleeve member and said blowpipe means.

8. In apparatus of the character described, the combination of a tubular member adapted to be inserted in the open end of a pipe with a portion thereof projecting beyond such open end, clamping means mounted on said tubular member adjacent the inner end thereof for supporting the said tubular member within the pipe substantially in its center line, a shaft extending through said tubular member and operatively connected to said clamping means, means at the outer end of said tubular member for axially moving said shaft to actuate said clamping means, a rotatable sleeve member disposed about said tubular member and axially immovable thereon, a post normally spaced from the open end of the pipe and disposed radially to said sleeve member and mounted thereon, blowpipe means operative to deliver jets of heating and oxidizing agents, means including an arm extending substantially parallel to said tubular member and mounted on said post for supporting said blowpipe means, mechanism including gearing mounted on said tubular member for rotating said sleeve member and said blowpipe means, and means including a shield member carried by said arm and disposed between said blowpipe means and said shaft moving means and said mechanism for protecting the latter from sparks and heat resulting from the operation of said blowpipe means.

9. In apparatus of the character described, the combination of a tubular member adapted to be inserted in the open end of a pipe with a portion thereof projecting beyond such open end, clamping means mounted on said tubular member adjacent the inner end thereof for supporting the said tubular member within the pipe substantially in its center line, a shaft extending through said tubular member and operatively connected to said clamping means, means at the outer end of said tubular member for axially moving said shaft to actuate said clamping means, a rotatable sleeve member disposed about said tubular member and axially immovable thereon, blowpipe means operative to deliver jets of gaseous heatting and oxidizing agents, means for supporting said blowpipe means on said sleeve member, mechanism including gearing mounted on said tubular member for rotating said sleeve member and said blowpipe means supported thereby, and shield means cooperating with said blowpipe supporting means tending to protect said shaft moving means and said mechanism from sparks and heat resulting from the operation of said blowpipe means.

10. In apparatus of the character described, the combination of a tubular member adapted to be inserted in the open end of a pipe with a portion thereof projecting beyond such open end, a plurality of radially movable elements, means secured to said tubular member and associated with said elements for positioning said elements in spaced relation adjacent the inner end of said tubular member, a shaft extending through said tubular member and operatively connected to said elements, means at the outer end of said tubular member for axially moving said shaft to actuate said elements radially outward against the inner peripheral surface of the pipe for clamping said tubular member substantially in the center line of the pipe, means associated with each of said radially movable elements for independently adjusting each element radially for clamping said tubular member within pipes having irregular surfaces, blowpipe means mounted for rotation on said member, and means for rotating said blowpipe means.

11. In apparatus of the character described, the combination of a tubular member adapted to be inserted in the open end of a pipe with a portion thereof projecting beyond such open end, a plurality of radially movable elements, means secured to said tubular member and associated with said elements for positioning and maintaining said elements substantially parallel to said tubular member at the inner end thereof, radially adjustable studs fixed to each of said elements and adapted to contact the inner peripheral surface of the pipe, a shaft extending through said tubular member and operatively connected to said elements, means at the outer end of said tubular member for axially moving said shaft to actuate said elements radially outward against the inner peripheral surface of the pipe for clamping said tubular member substantially in the center line of the pipe, blowpipe means mounted for rotation on said tubular member, and means for rotating said blowpipe means.

12. In apparatus of the character described, the combination of a tubular member adapted to be inserted in the open end of a pipe with a portion thereof projecting beyond such open end, means mounted on said tubular member adjacent the inner end thereof for clamping and supporting said tubular member within the pipe substantially in its center line, a shaft extending through said tubular member and operatively connected to said clamping means, means at the outer end of said tubular member for axially moving said shaft to actuate said clamping means, resilient means disposed about said shaft tending to resist or oppose axial movement of said shaft after said clamping means effectively engages the inner peripheral surface of the pipe, blowpipe means rotatably mounted on said tubular member, and means for rotating said blowpipe means.

JAMES H. BUCKNAM.
FRANK C. GEIBIG.